G. A. HIGBEE.
FISHING REEL.
APPLICATION FILED MAR. 26, 1921.
1,398,721.
Patented Nov. 29, 1921.
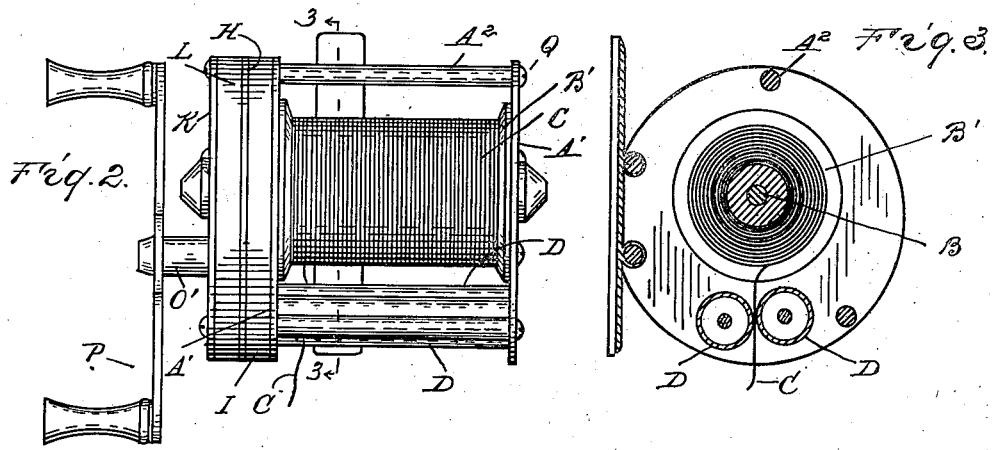
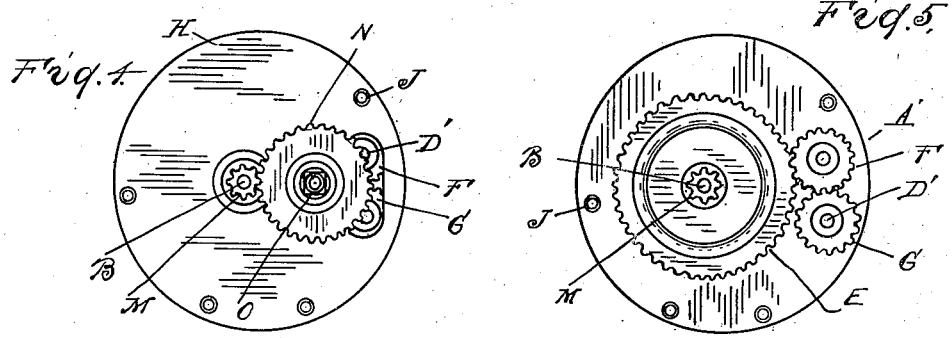
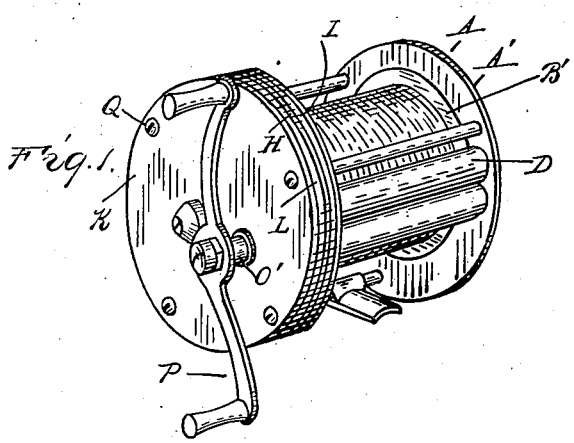
Inventor
Glenn A. Higbee
By Whittemore, Hulbert, Whittemore, and Belknap
Attorneys

UNITED STATES PATENT OFFICE.

GLENN A. HIGBEE, OF DETROIT, MICHIGAN.

FISHING-REEL.

1,398,721. Specification of Letters Patent. Patented Nov. 29, 1921.

Application filed March 26, 1921. Serial No. 455,940.

*To all whom it may concern:*

Be it known that I, GLENN A. HIGBEE, a citizen of the United States of America, residing at Detroit, in the county of Wayne and State of Michigan, have invented certain new and useful Improvements in Fishing-Reels, of which the following is a specification, reference being had therein to the accompanying drawings.

This invention relates to fishing reels, and it is the object of the invention to provide a fishing reel that will not be subject to back lash. With fishing reels as now constructed it is necessary, in casting, that the fisherman restrain somewhat the velocity of rotation of the reel as the line is wound therefrom to prevent back lash, that is to say a loosening of the convolutions of the line upon the reel due to rotation of the reel at greater velocity than that with which the line is drawn therefrom. This necessity not only requires the exercise of considerable skill and care upon the part of the fisherman, but further limits the distance through which the line may be cast since it is impossible to exactly proportion the retardation of the reel to the advance of the cast line.

The present invention provides for elimination of this objectionable feature by maintaining a constant tension upon the line as it leaves the reel.

A preferred embodiment of the invention is hereinafter described and illustrated in the accompanying drawing wherein:

Figure 1 is a perspective view of the improved reel;

Fig. 2 is a plan view of the same;

Fig. 3 is a cross section on line 3—3 of Fig. 2;

Fig. 4 is an end view of the reel with the handle and end plate removed to disclose the gears for driving the reel from the handle;

Fig. 5 is a view of the same end of reel with additional parts removed to disclose the gearing for actuating the rollers which tension the line as it leaves the reel.

In these views, the reference character A designates the frame of the reel which is of the usual construction comprising circular end plates A' and a plurality of rods $A^2$ rigidly spacing said plates. In the plates A' there is journaled a shaft B upon which is mounted fast a drum B' upon which the fish line C is adapted to be wound. Said line in leaving the drum B' passes between a pair of adjacent rollers D preferably made tubular for the sake of lightness, and mounted fast upon shafts D' which shafts are journaled in the outer portions of the end plates A' of the frame. Adjacent one of the end plates A' there is mounted fast upon the shaft B a gear E. Said gear meshes with a gear F driving one of the rollers D, and the other roller D is reversely driven by a pinion G respectively mounted upon the shafts of said rollers. The gears E, F and G are arranged within a housing formed by the end plate A' of the frame and adjacent spaced plate H, and a spacer ring I, the latter being mounted upon extensions J of the rods $A^2$. Another gear housing is formed by said plate H, and an end plate K outwardly spaced from the plate H by a second spacer ring L which is likewise mounted upon the rod extensions J. Within this outer gear housing a pinion M is mounted fast upon the drum shaft B and is engaged by a gear N journaled upon a pin O rigidly projecting outward from the intermediate plate H. A sleeve O' projecting rigidly outward from the gear N is engageable by the actuating handle or crank P. Screws Q clamp the two rings I and L, and two plates H and K upon the extensions J.

In the use of the described invention, when the handle P is turned, the gearing N and M effects rotation of the shaft B and drum B' at a velocity considerably greater than that of the handle. Also the train of gears E, F and G effect an opposite rotation of the rollers D at a velocity considerably greater than that of said drum. Since the rollers D are so spaced as to slightly engage the line C passing between said rollers, it is evident that said rollers will tend to advance the line as it leaves the reel more rapidly than is permitted by rotaton of the reel so that a constant tension of the line between the drum and said rollers is assured. The existence of such a tension of course eliminates back lash or slackening of the coils of the line upon the drum while the line is being cast. It is important that the rollers D be so spaced as to barely enter into frictional contact with the line C since the creation of too much tension in said line between said rollers and the drum would appreciably increase the effort required for winding in the line, and would further tend to retard the line in casting. Said tension may be very slight and still suffice to eliminate back lash. Obviously the arrangement of the gears may be variously modified and still secure substantially the described result.

What I claim as my invention is:

1. A fishing reel comprising a frame, a drum rotatable in said frame, a fish line wound upon said drum, and rotative means for frictionally tensioning a portion of said line adjacent the drum during unwinding of the line.

2. A fishing reel comprising a frame, a drum revolubly mounted in said frame, means for rotating said drum, a fish line wound upon said drum, and a rotative member carried by the frame driven in common with the drum for tensioning the portion of the line adjacent the drum.

3. A fishing reel comprising a frame, a drum rotatively mounted in said frame, a fish line reeled upon said drum, means for rotatively actuating the drum, and means actuated rotatively in common with the drum at greater peripheral speed than that of the drum frictionally engaging the line as it leaves the drum to tension said line.

4. A fishing reel comprising a frame, a drum rotatably mounted in said frame, a fish line reeled upon said drum, a pair of adjacent rollers rotatably mounted in said frame between which said line passes from the drum, means for actuating the drum, and means for actuating said rollers oppositely and at a peripheral speed greater than that of the drum.

5. A fishing reel comprising a frame, a drum rotatably mounted in said frame, a pair of rollers journaled in said frame and frictionally engaging the line as it leaves said drum, an actuating handle for the drum, gearing for actuating the drum from said handle, a train of gearing for actuating said rollers from the drum at an increased peripheral speed and housings for said gearing carried by said frame at one end thereof.

In testimony whereof I affix my signature.

GLENN A. HIGBEE.